United States Patent
Eschbach et al.

(10) Patent No.: US 7,324,241 B2
(45) Date of Patent: Jan. 29, 2008

(54) VARIABLE DATA DIFFERENTIAL GLOSS IMAGES

(75) Inventors: Reiner Eschbach, Webster, NY (US); Zhigang Fan, Webster, NY (US); James R. Low, Rochester, NY (US); William A. Fuss, Rochester, NY (US); Shen-Ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 702 days.

(21) Appl. No.: 10/954,125

(22) Filed: Sep. 29, 2004

(65) Prior Publication Data

US 2006/0072159 A1    Apr. 6, 2006

(51) Int. Cl.
*H04N 1/52*    (2006.01)
*B41M 3/10*    (2006.01)
*G06K 15/14*    (2006.01)

(52) U.S. Cl. .................... 358/1.9; 358/3.28; 358/534

(58) Field of Classification Search ............... 358/1.9, 358/3.06, 3.13–3.2, 3.26–3.28, 534–536, 358/537–538; 382/237, 270, 162; 428/195.1; 399/341–342; 283/91, 93, 114; 430/45.53
See application file for complete search history.

(56) References Cited

U.S. PATENT DOCUMENTS

| | | | |
|---|---|---|---|
| 3,317,317 A | 5/1967 | Clark | 96/1.4 |
| 3,784,289 A * | 1/1974 | Wicker | 283/93 |
| 4,149,194 A * | 4/1979 | Holladay | 358/3.16 |
| 4,210,346 A | 7/1980 | Mowry, Jr. et al. | 283/93 |
| 4,310,180 A | 1/1982 | Mowry, Jr. et al. | 283/93 |
| 5,087,507 A | 2/1992 | Heinzer | 428/195 |
| 5,165,071 A | 11/1992 | Moriya et al. | |
| 5,234,783 A * | 8/1993 | Ng | 430/45.53 |
| 5,239,625 A | 8/1993 | Bogart et al. | |
| 5,487,567 A | 1/1996 | Volpe | 283/72 |
| 5,583,660 A | 12/1996 | Rylander | 358/3.17 |
| 5,678,133 A | 10/1997 | Siegel | 399/67 |
| 5,695,220 A | 12/1997 | Phillips | 283/91 |
| 5,710,636 A * | 1/1998 | Curry | 358/3.28 |

(Continued)

FOREIGN PATENT DOCUMENTS

EP    0 478 012 A2    4/1992

(Continued)

OTHER PUBLICATIONS

Shen-ge Wang et al., U.S. Appl. No. 10/159,432, filed May 30, 2002, entitled "Application of Glossmarks for Graphics Enhancement".

(Continued)

*Primary Examiner*—Scott A. Rogers
(74) *Attorney, Agent, or Firm*—Christopher D. Wait

(57) ABSTRACT

The present invention relates to the segmentation of an image into a main area and a image segment for variable data differential gloss image control. A single color is selected. Two or more different color definitions are created by combining the selected single color with two or more halftones having anisotropic structure characteristics which are significantly different in orientation to each other while remaining identical in density. By alternatively assigning the color definitions to the image segment in accord with the variable data content, a variable data differential gloss image may be superimposed within an image having reduced data processing and storage requirements.

38 Claims, 5 Drawing Sheets

U.S. PATENT DOCUMENTS

| | | | | |
|---|---|---|---|---|
| 5,734,752 | A | 3/1998 | Knox | 382/212 |
| 5,751,432 | A * | 5/1998 | Gwaltney | 358/296 |
| 5,788,285 | A | 8/1998 | Wicker | 283/93 |
| 5,853,197 | A | 12/1998 | Mowry, Jr. et al. | 283/91 |
| 6,108,512 | A | 8/2000 | Hanna | 399/366 |
| 6,606,168 | B1 * | 8/2003 | Rylander | 358/3.09 |
| 6,714,320 | B1 * | 3/2004 | Nakahara et al. | 358/3.13 |
| 6,763,121 | B1 * | 7/2004 | Shaked et al. | 382/100 |
| 6,906,825 | B1 * | 6/2005 | Nakahara et al. | 358/1.9 |
| 7,020,349 | B2 * | 3/2006 | Brunk | 382/289 |
| 7,092,128 | B2 * | 8/2006 | Wang et al. | 358/3.06 |
| 7,126,721 | B2 * | 10/2006 | Wang et al. | 358/3.06 |
| 7,139,101 | B2 * | 11/2006 | Loce et al. | 358/3.06 |
| 7,139,521 | B2 * | 11/2006 | Ng et al. | 399/341 |
| 7,148,999 | B2 * | 12/2006 | Xu et al. | 358/3.06 |
| 7,180,631 | B2 * | 2/2007 | Ide et al. | 358/1.9 |
| 7,180,635 | B2 * | 2/2007 | Wang et al. | 358/3.06 |
| 7,193,751 | B2 * | 3/2007 | Wang et al. | 358/3.06 |
| 2003/0194148 | A1 | 10/2003 | Haeberli | |
| 2005/0025333 | A1 * | 2/2005 | Fujii et al. | 382/100 |
| 2005/0031160 | A1 * | 2/2005 | Shaked et al. | 382/100 |
| 2005/0128523 | A1 * | 6/2005 | Liu et al. | 358/3.06 |
| 2005/0128524 | A1 * | 6/2005 | Liu et al. | 358/3.06 |
| 2005/0135851 | A1 * | 6/2005 | Ng et al. | 399/341 |
| 2005/0286083 | A1 * | 12/2005 | Wang et al. | 358/3.06 |
| 2006/0044617 | A1 * | 3/2006 | Wang et al. | 358/3.06 |
| 2006/0127117 | A1 * | 6/2006 | Eschbach et al. | 399/67 |
| 2007/0139714 | A1 * | 6/2007 | McElvain | 358/3.06 |

FOREIGN PATENT DOCUMENTS

| | | | |
|---|---|---|---|
| EP | 0 859 506 | A1 | 8/1998 |
| EP | 1 367 810 | A2 | 12/2003 |
| EP | 1370062 | A1 * | 12/2003 |
| EP | 1 377 007 | A2 | 1/2004 |
| EP | 1377007 | A2 * | 1/2004 |
| EP | 1377028 | A1 * | 1/2004 |
| EP | 1705529 | A1 * | 9/2006 |
| EP | 1705531 | A1 * | 9/2006 |
| GB | 2 217 258 | A | 10/1989 |

OTHER PUBLICATIONS

Shen-ge Wang et al., U.S. Appl. No. 10/159,423, filed May 30, 2002, entitled "Halftone Image Gloss Control for Glossmarks".

Beilei Xu et al., U.S. Appl. No. 10/186,065, filed Jun. 27, 2002, entitled "Variable Glossmark".

Shen-ge Wang et al., U.S. Appl. No. 10/184,219, filed Jun. 27, 2002, entitled Protecting Printed Items Intended for Public Exchange With Glossmarks.

* cited by examiner

VARIABLE DATA DIFFERENTIAL GLOSS IMAGES

CROSS-REFERENCE TO RELATED APPLICATIONS

Cross reference is made to the following applications, the disclosures of each of which are totally incorporated by reference herein: U.S. application Ser. No. 10/159,432 entitled "APPLICATION OF GLOSSMARKS FOR GRAPHICS ENHANCEMENT" to inventors Shen-ge Wang, Beilei Xu, and Chu-heng Liu; U.S. application Ser. No. 10/159,423 entitled "HALFTONE IMAGE GLOSS CONTROL FOR GLOSSMARKS", to inventors Shen-ge Wang, Beilei Xu, and Chu-heng Liu; U.S. application Ser. No. 10/186,065 entitled "VARIABLE GLOSSMARK" to inventors Shen-ge Wang, Beilei Xu, and Chu-heng Liu; and U.S. application Ser. No. 10/184,219 entitled "PROTECTING PRINTED ITEMS INTENDED FOR PUBLIC EXCHANGE WITH GLOSSMARKS" to inventors Shen-ge Wang, Beilei Xu, and Chu-heng Liu. The appropriate components and processes of the above co-pending applications may be selected for the invention of the present application in embodiments thereof.

BACKGROUND AND SUMMARY

The present invention in various embodiments relates generally the gloss inherent in the hardcopy of image data be it pictorial or text. More particularly, this invention relates to halftoned image data and the control of differential gloss when that halftone image data is printed into hardcopy.

It is desirable to have a way to protect against the copying of a document. Most desirably in a manner that part of the content can be readily observed by a human reader but not by a copier scanner. It is desirable that such a solution also have a minimum impact in its digital processing overhead requirements as well as minimizing any storage requirements. One approach is where an image is printed using clear toner or ink, creating a difference in reflected light and diffused light that can be discerned by a human reader by holding the paper at an angle, but can not typically be detected by a copier scanner which is restricted to reading at fixed angles to the page. Such an approach provides a differential gloss image.

There has been a need for a printer that can print a page that can be read but not copied. One method, described in U.S. Pat. Nos. 4,210,346 and 5,695,220, is to use a particular white toner and a particular white paper that are designed to have different diffused light characteristics at different angles. Of course, this system requires special, matched paper and toner.

In U.S. Pat. No. 6,108,512 to Hanna, there is illustrated, for example, a system for producing non-copyable prints. In a xerographic printer, text is printed using clear toner. Thus, the only optical difference between toner and non-toner portions of the page is in the reflectivity. The plastic toner will reflect more light than the paper. A human reader can now read the image by holding the page at such an angle that the eye will intercept the reflected light from the toner, producing a contrast between the lighter appearing toner and the darker appearing paper. However, a copier scanner is always set up to avoid reflected light, by supplying light at an oblique angle and reading at a right angle. In this case, the diffused light is approximately equal for both toned and untoned surfaces, the scanner will detect no difference and the copier will not be able to copy the original.

Another approach taken to provide a document for which copy control is provided includes digital watermarking. As an example in U.S. Pat. No. 5,734,752 to Knox, there is illustrated a method for generating watermarks in a digitally reproducible document which are substantially invisible when viewed including the steps of: (1) producing a first stochastic screen pattern suitable for reproducing a gray image on a document; (2) deriving at least one stochastic screen description that is related to said first pattern; (3) producing a document containing the first stochastic screen; (4) producing a second document containing one or more of the stochastic screens in combination, whereby upon placing the first and second document in superposition relationship to allow viewing of both documents together, correlation between the first stochastic pattern on each document occurs everywhere within the documents where the first screen is used, and correlation does not occur where the area where the derived stochastic screens occur and the image placed therein using the derived stochastic screens becomes visible.

For each of the above patents and citations the disclosures therein are totally incorporated herein by reference in their entirety.

As disclosed in U.S. application Ser. No. 10/159,423 entitled "HALFTONE IMAGE GLOSS CONTROL FOR GLOSSMARKS", to inventors Shen-ge Wang, Beilei Xu, and Chu-heng Liu (cross referenced and incorporated above), there is provided an arrangement and methodology which will control gloss and allow manipulation for Glossmark differential gloss images without requiring special toners/inks or paper/substrates, nor require the superimposition of additional prints to allow viewing. However, with such an arrangement and methodology, there is inherent a requirement for additional electronic processing beyond that otherwise normally needed. There may also be increased storage requirements entailed as well. A typical scenario for variable data is in the area of mass mailing where mail fliers are personalized "on-the-fly" with variable data inserted into provided fields in the document as the document is hardcopy printed. As will be well understood by those skilled in the art any undo image data processing overhead would unacceptably impact the printing process. It would therefore be desirable to minimize the impact of such required additional electronic processing with a variant providing a further improved methodology for the manipulation of inherent differential gloss.

As further disclosed in U.S. application Ser. No. 10/186,065 entitled "VARIABLE GLOSSMARK", to inventors Shen-ge Wang, Beilei Xu, and Chu-heng Liu (cross referenced and incorporated above), there is provided an arrangement and methodology which relates to the segmentation of an image into a main area and a image segment for the sake of providing variable Glossmark™ data. By selectively applying halftones with anisotropic structure characteristics which are significantly different in orientation while remaining identical in density to the image segment, a variable Glossmark™ may be superimposed within an image with reduced processing and storage requirements. However, the basic creation of variable data Glossmark™ areas in a hardcopy page (as well as correlation marks in general) must start by combining a primary image with a desired variable image data provided as required in a Glossmark™ scenario as binary mask data. In the portions of the image selected by the binary mask data one halftone screen is used. In other portions of the image an alternate halftone screen is used. Thus, it follows that two data channels need to be combined where one data channel controls the halftone fine structure and the other data channel delivers the image content. In standard DFEs (digital front-ends), as provided in copiers, printers, multifunction devices, or digital presses, these channels are simply not available—nor is IOT (image output terminal) access for the halftoning commonly accessible at this level—so that the complete Glossmark™ or correlation mark must be created off-line and inserted. This effectively impedes the ability for creation of Variable Data Glossmark™, particularly on-the-fly in a digital press mass mailing scenario, since all images must be computed externally. This causes several problems in data flow, data handling, and data bandwidth. Described herein below is an approach for solving this problem.

Disclosed in embodiments herein, is a method for variable data differential gloss image control comprising selecting a single color, and selecting a first halftone having a first anisotropic structure orientation, as well as a second halftone having a second anisotropic structure orientation different from that of the first halftone. A first color definition comprised of the single color and the first halftone is created. A second color definition comprised of the single color and the second halftone is also created. The first color definition is applied to at least some portion of an image of interest; and the second color definition is applied to the remaining portion of the image of interest to produce a variable data differential gloss image.

Further disclosed in embodiments herein, is a method for variable data differential gloss image control. The method comprises segmenting an image of interest into a main area and a segment area and selecting a single color. A first halftone having a first anisotropic structure orientation is selected for creating a first color definition comprised of the single color and the selected first halftone. A second halftone having a second anisotropic structure orientation different from that of the first halftone is selected for creating a second color definition comprised of the single color and the selected second halftone. This is followed by applying the first color definition to at least some portion of the segment area; and applying the second color definition to the remaining portion of the segment area to produce a variable data differential gloss image.

Further disclosed in embodiments herein, is a method for variable data differential gloss image control comprising segmenting an image of interest into a main area and a segment area for variable data and selecting a single color. A first halftone having a first anisotropic structure orientation is selected for creating a background color definition comprised of the single color and the first halftone. A second halftone having a second anisotropic structure orientation different from that of the first halftone is selected for creating a foreground color definition comprised of the same single color but with the second halftone. This is followed by applying the background color definition to fill the segment area and writing an alphanumeric string into the segment area with the foreground color definition to produce a variable data differential gloss image.

Further disclosed in embodiments herein, is a method for variable data differential gloss image control comprising segmenting an image of interest into a main area and a pre-selected area for variable data and selecting a first single color described by an anisotropic pattern structure. This is followed by rendering said pre-selected area in said first single color. The method further comprises selecting a second single color, differing from said first single color only in described anisotropic pattern structure. This is then followed by selecting a font, outline or shape and rendering said font, outline, or shape with said second single color in said pre-selected area to produce a variable data differential gloss image.

DETAILED DESCRIPTION

By proper utilization of the perceived differential gloss inherent between various anisotropic halftone dot structures, the desired manipulation of perceived gloss and the generation of Glossmark™ images via that differential gloss may be achieved without the need for special paper or special toners or inks.

Figure 1:
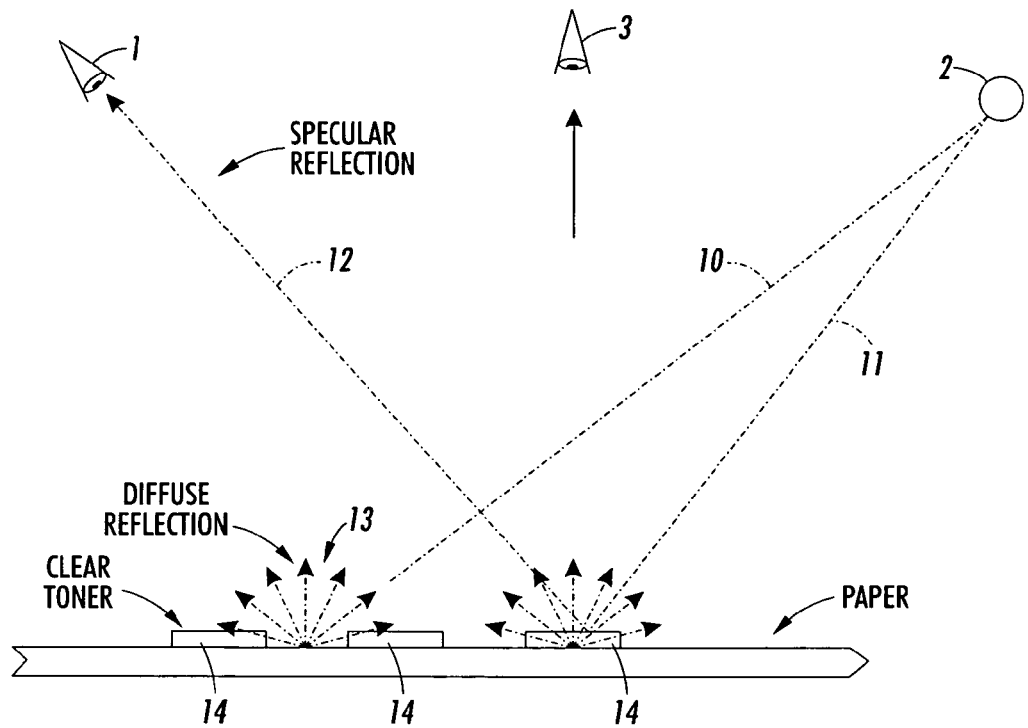
FIG. 1 shows how the human eye can detect a large difference between the glossy portions of the page but a scanner detector cannot.

FIG. 1 shows how the human eye 1 can read gloss upon the page and a scanner cannot. Three glossy areas 14 are shown. One ray of light 10 from the light source 2 hits the paper at a point where there is no gloss toner 14, and the reflected light 13 is diffused so that there is only a small amount of light in all directions, including the direction toward the human eye 1. Another ray of light 11 of equal intensity touches the paper at a point where there is gloss toner 14. Here, there is a large amount of reflected light 12 in the indicated direction. If the human eye 1 is positioned as shown, a large difference between glossy and non-glossy toner areas is readily observable by the human eye 1. However, the scanner 3 reads incident light at right angles to the paper. In this case, there is only a small amount of diffused light coming from both the glossy and non-glossy dots, and the scanner can not detect a difference. This is one manner for creating a gloss image which cannot be scanned by conventional copiers and scanners.

Figure 2:
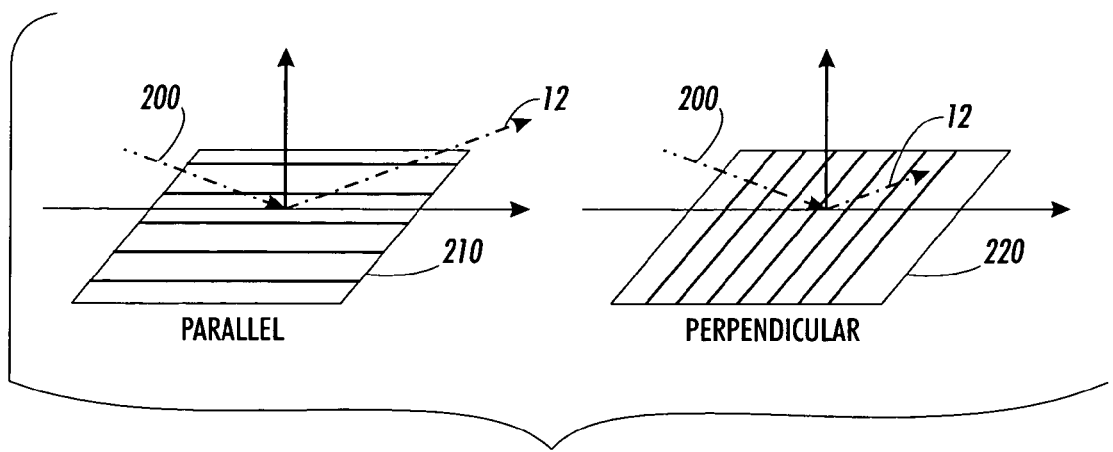
FIG. 2 depicts a differential gloss found in simple line-screen halftones.

Heretofore, there has been little appreciation for the fact that the inherent reflective and diffusive characteristics of halftones may be manipulated to be directive of incident light as about an azimuth by use of a halftone structure which the inherent gloss is anisotropic in nature. A mirror is equally reflective regardless of the azimuth of the light source relative to the plane of the mirror. Similarly, an ordinary blank paper is equally reflective and diffusive regardless of the azimuth of the light source. However, printed matter can and will often display differing reflective and diffusive characteristics depending upon the azimuth of origin for a light source relative to the structural orientation of the halftone. Such reflective characteristics when maximized are exhibited in a halftone with a structure which is anisotropic in nature. In other words, the indicatrix used to express the light scattered or reflected from a halftone dot will maximally vary depending upon the halftone dot's azimuth orientation to the light source when that halftone has an anisotropic structure. FIG. 2 provides an example of what is meant by anisotropic structure.

In FIG. 2, a simple line-screen halftone of anisotropic nature is presented in two orientations relative to impinging incident light 200, a parallel orientation 210, and a perpendicular orientation 220. Both halftone dot orientations are selected to be similar in density so that the diffuse light and incident light at orthogonal angles to the paper are equal. In this way, the light which is available to scanner 3 or to the human eye from straight on is the same. However, the specular reflected light 12 is considerably greater for the anisotropic parallel orientation 210. If as printed, a mass of the 210 parallel orientation halftones are butted directly adjacent to a mass of 220 perpendicular orientation halftones, there will be a difference in reflected light between them, which when viewed from an angle will be perceived as a shift in gloss differential or a Glossmark™ image. The perceptibility of this gloss differential will be maximized when the halftone anisotropic orientations are 90 degrees apart as shown here in FIG. 2.

Figure 3:
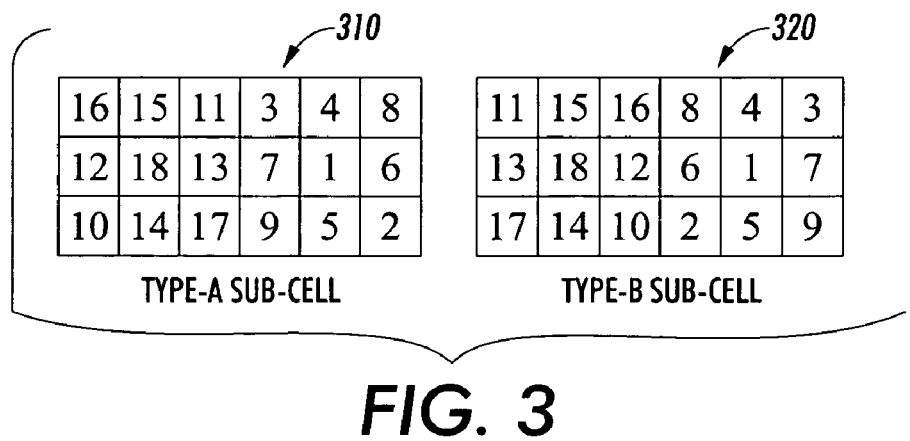
FIG. 3 shows two 3×6 halftone patterns suitable in anisotropic structure to produce discernable gloss differential for practicing the present invention.
Figure 4:
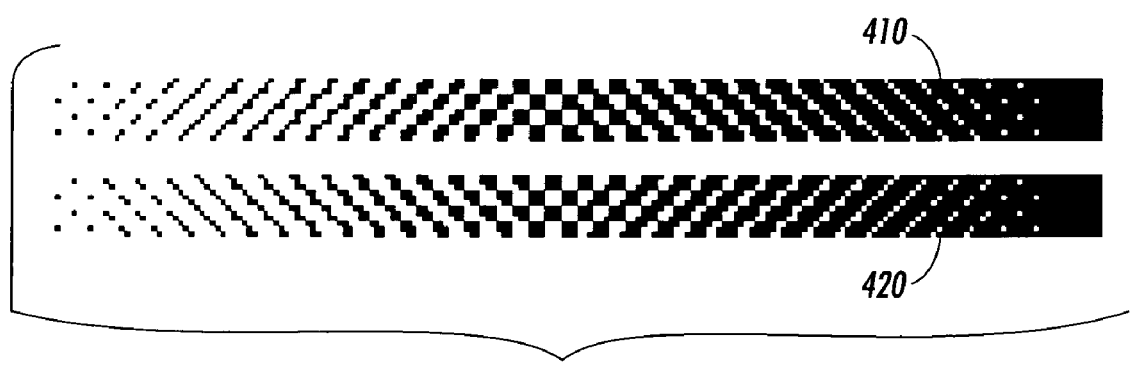
FIG. 4 is a density sweep of the two halftone patterns of FIG. 3.

FIG. 3 shows example halftone cells suitable for a skilled practitioner to employ in an embodiment employing the teachings of the present invention. They are but one useful example as will be evident to those skilled in the art. Each halftone cell is comprised as a three by six pixel array. The turn on/off sequence is numerically indicated. Note the diagonal orientation of the pixel numbering. The type-A sub-cell 310 and type-B sub-cell 320 both have a 45 degree orientation, one to the right and the other to the left. This orientation can be clearly seen in the density sweeps 410 and 420 of FIG. 4. To maximize the perceptibility of the gloss differential, the orientations of sub-cells type-A and type-B are arranged 90 degrees apart one from the other.

Figure 5:
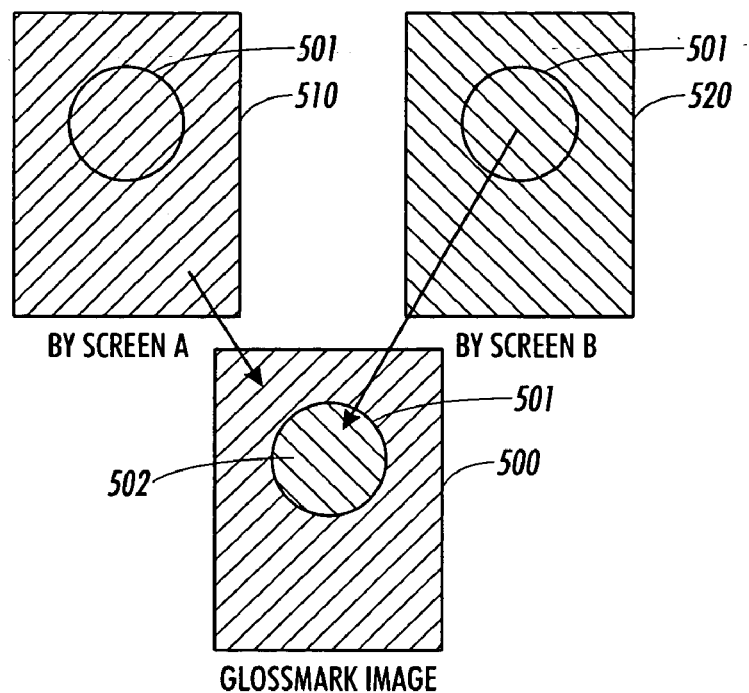
FIG. 5 depicts a patchwork alternating of the two halftone patterns of FIG. 3 so as to achieve a Glossmark™ image.

FIG. 5 depicts a Glossmark™ image 500 achievable using halftone cells as described above. Screen-A 510 uses one halftone cell type and screen-B 520 uses the other. The circle 501 is provided as a visual aid across the image screens 500, 510 and 520. The desired Glossmark™ image here is for a sphere 502 to be perceived in the midst of image 500. Screen-A 510 provides the field of right diagonal oriented anisotropic halftones and screen 520 provides the spherical area of left diagonal oriented anisotropic halftone cells. In this manner, a selection of the two screen types are patchworked together to create the Glossmark™ image 500.

Figure 6:
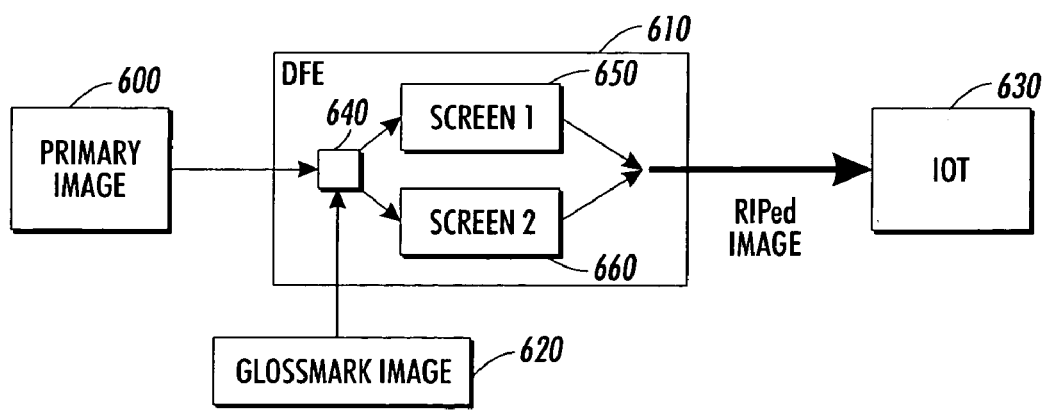
FIG. 6 shows one embodiment for achieving the image directed alternation of the halftone patterns for Glossmark™ images as depicted in FIG. 5, utilizing the halftone patterns of FIG. 3.

An another approach for the assembly of a Glossmark™ image is diagramed in FIG. 6. Here, the primary image 600 is received as input data to the digital front-end (DFE) 610 as is normal. However, a desired Glossmark™ image data 620 is also received as input data to the DFE 610 as well. The processed image as sent to the image output terminal (IOT) 630 is a binary image by halftoning the primary image 600 data as is normal. However, the halftone type selection is driven by the intended Glossmark™ image data 620 as input to multiplexer switch 640. The intended Glossmark™ image data 620 will serve to direct a portion of the primary image 600 to use a first anisotropic structured halftone while directing an alternative halftone to be used for the remainder of primary image 600. As will be understood by those skilled in the art, the intended Glossmark™ image data 620 may be flattened into simple zero and one pixel data representations if needed in the DFE 610. This pattern of zero and ones are then used to toggle the multiplexer 640 to one halftone anisotropic structure orientation type or the other. Multiplexer 640 therefore toggles between either screen 1 type halftone 650 or screen 2 halftone type 660, as dictated by the desired Glossmark™ data 620, to produce the composite result of raster input processed (RIP) image data as passed to the IOT 630. In this way, a superimposition of a pattern 620 is imbedded into the primary image 600 which can only be perceived as a gloss differential Glossmark™ image.

Figure 7:
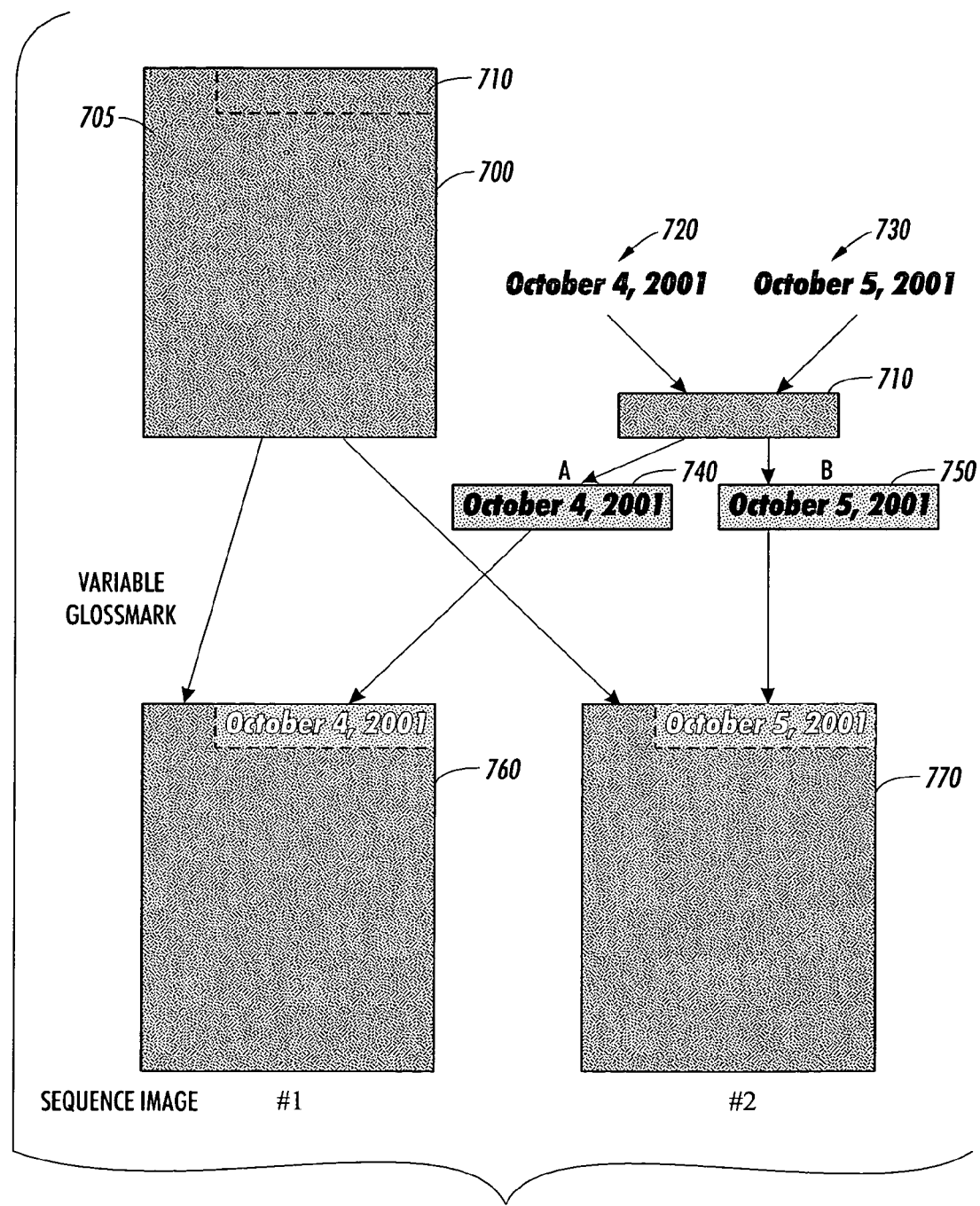
FIG. 7 depicts a visualization for the swapping of a small portion of an image of interest for a suitable variable glossmark image segment.

In FIG. 7, there is depicted the swapping of only a small segment of an image of interest 700 with a variable Glossmark™ image segment 710. If only a small area of a given image of interest 700 is needed to satisfy the desire for Glossmark™ imaging, the problems of increased processing time and memory storage overhead in the accommodation of Glossmark™ images can be greatly ameliorated. There are many situations where only a small area of an image 700 is targeted for Glossmark™ imaging. For example, a date/time stamp is a very common and popular image adjunct. Having such information available in a manner which is less visually intrusive while viewing a desired image of interest is preferable and readily achieved by employing Glossmark™ imaging to the time/date stamp information. Utilization of variable Glossmark™ image segment 710 is of particularly attractive use when the data contained therein is ephemeral in nature or often changing. Other scenarios of such use is in accommodating serial numbers as Glossmark™ images for either tickets or coupons; personalized information in mass mailings; and may include job processing/integrity numbers, bar-codes, company trademarks or logos. Glossmarking applied to such uses discourages falsification or fraud while serial numbers or other changing indicia allows for tracking.

As described in FIG. 7, the image of interest data 700 is segmented into a main area 705 and an image segment area 710. The main area 705 is conventionally halftoned with a first halftone having a first anisotropic structure orientation. However, for the image segment 710 the halftoning is performed as per the description provided above for FIGS. 5 and 6. The variable Glossmark™ image segment 710 utilizes the input data from image 700 corresponding to the segment area. This is utilized as the primary image data 610 to the DFE. The incoming flat binary variable Glossmark™ data, which for example A is "Oct. 4, 2001" 720 is utilized as the input to multiplexer switch 640. In this manner variable Glossmark™ image segment 710 is halftoned with both the first halftone having a first anisotropic structure orientation and a second halftone having a second anisotropic structure orientation. In this example, variable Glossmark™ image data 740 is the result. In one embodiment, the area of segment 710 which is not to be overlaid by Glossmark™ data, i.e. the background, is halftoned with the first halftone type as used for main image area 700. In an alternative, the background is halftoned with a second halftone having a second anisotropic gloss structure orientation.

In a second example "B", as displayed in FIG. 7, the same image of interest data 700 and image segment 710 are employed. However, the variable Glossmark™ data 730 is "Oct. 5, 2001". The same methodology, as just described above, is employed again to result in variable Glossmark™ data 750 for this example. For both examples "A" & "B", the variable Glossmark™ images 740 and 750 are each independently merged with the halftoned main image of interest data 705 to create the respective sequence images 760 and 770. Thus, while FIG. 7 depicts only two Glossmark™ image date stamps by example, it will be apparent to those skilled in the art the technique may be applied for as many variable Glossmark™ image segments as there is desire and storage available to accommodate.

The basic creation of variable data Glossmark™ areas in a hardcopy page (as well as correlation marks in general) must start by combining a primary image with a desired variable image data, provided as required in a Glossmark™ scenario, as binary mask data. In the portions of the image as selected by the binary mask data one halftone screen is used. In other portions of the image an alternate halftone screen is used. Thus, it follows that two data channels need to be combined where one data channel controls the halftone cell structure and the other data channel delivers the image content. In standard a DFE (digital front-end), as provided in copiers, printers, multifunction devices, or digital presses, these channels are simply not available—nor is the IOT (image output terminal) access for the halftoning commonly accessible at this level—so that a complete Glossmark™ or correlation mark must be created off-line and inserted. This effectively impedes the ability for creation of Variable Data Glossmark™, since all images must be computed external to the DFE and included as EPS (Encapsulated Postscript) etc. during rendering. This causes several problems in data flow, data handling, and data bandwidth. Described herein is an approach for solving this problem by restricting the Variable Data content to font strings (arbitrarily shaped single valued objects) thereby allowing the use of Pattern Color Spaces as an alternate method for implementing variable data Glossmarks.

Glossmark™ differential gloss images are created by swapping or toggling the halftone structure in the hardcopy on a cell by cell basis. Thus a methodology for creating variable data Glossmark™ can be employed which overcomes the above stated problems by painting or toggling between two different "color" definitions, one for the constant portion of a field and the other for the variable data portion. The definition of each "color" includes a particular unique Glossmark™ anisotropic halftone structure in its definition, while possessing the same identical conventional average single color in its definition. These "color" definitions are atypically other than the norm. Classically, different colors definitions have distinctly different color assignments but retain the same structure. Here the definitions are each defined with the same color but have different structure assignments. In operation these "color" definitions are employed so that the variable data software will indicate that a particular field has a particular entry, where that entry is defined to be one (of the two or more) Glossmark™ "color" definitions, and the background of the field is another Glossmark™ "color" definition differing realistically only in halftone structure rather than in actual color. This arrangement is exemplary in that it can be implemented using standard variable data software, such as VIPP® (Variable Data Intelligence Postscript Printware) and other various document management software, such as FreeFlow™ and DocuSP®. However, it thus follows that in order to use the proposed method, the Glossmark™ variable data area has to be restricted to a graphic object having but a single color, just as is also true for some forms of correlation marks.

In PostScript® a single color can be user defined and be created as a pattern (Pattern Color Space). We take an arbitrary color (the choice of best colors for Glossmark™ visibility is done heuristically) and halftone this color twice. One time for the Glossmark™ foreground screen with a first anisotropic halftone, and one time for the Glossmark™ background screen with a second anisotropic halftone. These two patterns are then converted to the appropriate PostScript® patterns (using the PS operator "makepattern"). This conversion is done for the correct print resolution as well as for the correct halftone screen size.

Figure 8:
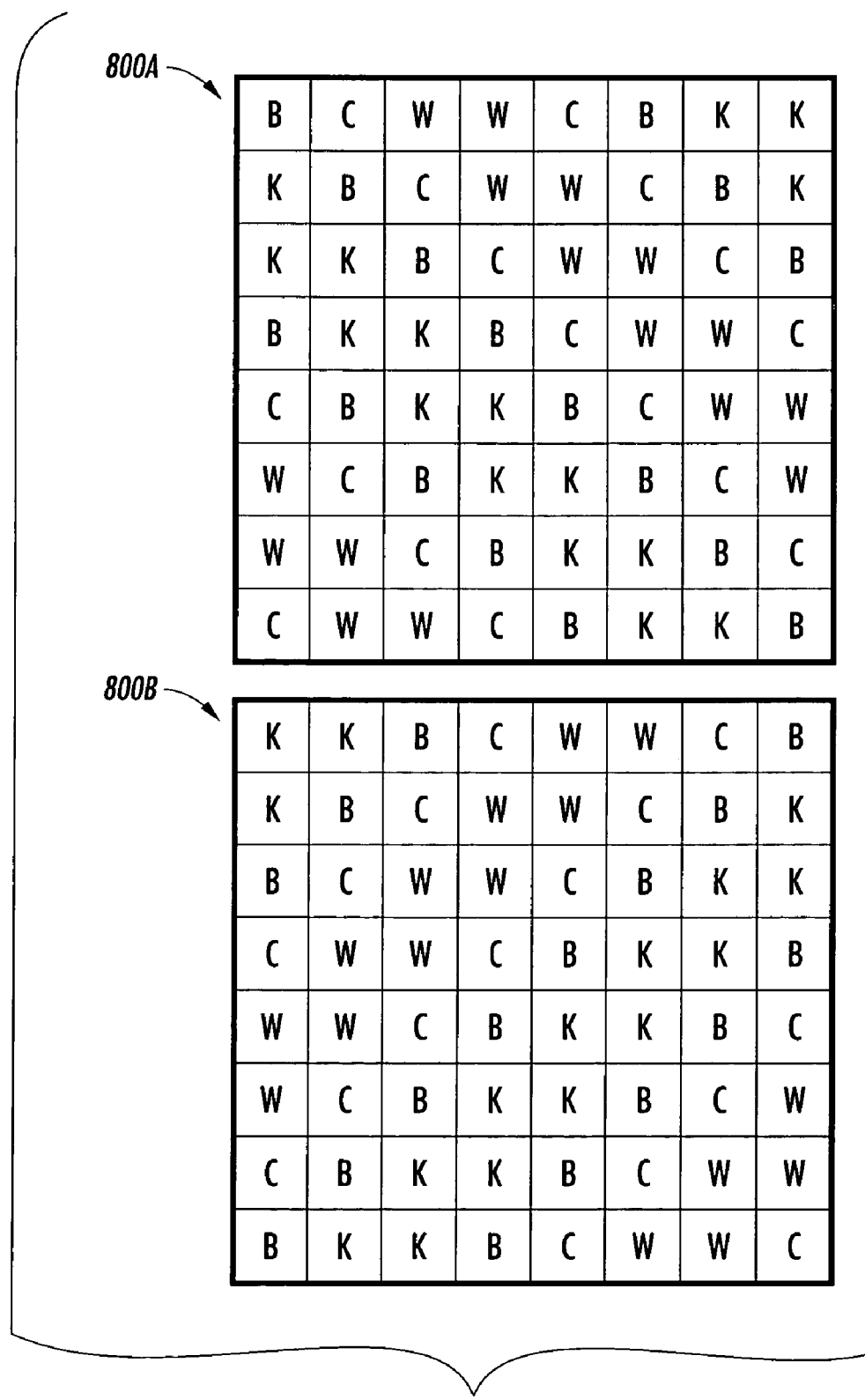
FIG. 8 depicts two different line type halftone cell "color" definitions incorporating in each the identical color while never-the-less possessing distinctly different anisotropic structures in a rotation 90 degrees from one another.

FIG. 8 depicts but one example illustration of halftone cells embodying the teachings provided herein. The two structures 800A and 800B of FIG. 8 are employed as two different "color" definitions. Each of the halftone cell structures has been provided with an anisotropic structure. Yet both structure 800A and 800B will exhibit the identical color, consisting as they do of identical amounts each of black (K), blue (B), cyan (C) and white (W) pixels. The two structures 800A and 800B when rendered are absolutely identical in color when measured using a standard measurement device for comparison, e.g.: standard L*a*b* values. The two "color" definitions differ however, in the detailed anisotropic pattern orientation they exhibit. The anisotropic orientation of structure 800A is aligned diagonally 45 degrees to the left, and the anisotropic orientation of structure 800B is aligned diagonally 45 degrees to the right. As will be understood by those skilled in the art, the patterns in FIG. 8 are provided as sample embodiments and were created as examples of the teachings provided herein as employed into a line type halftone. A dot type halftone could alternatively be used in which case the halftone cell structure would be more round or elliptical in form.

The result of this operation is the existence of two named colors that are callable through PostScript® and VIPP® (Variable Data Intelligence Postscript Printware), for simplicity, these colors can be referred to as "GlossForeGround" and "GlossBackGround". That these two colors are in effect colored patterns does not influence their treatment in PostScript®. It should be pointed out, as will be understood by those skilled in the art, that in Postscript®, patterns are registered with respect to the page origin and replicated to fill the entire page, i.e.: a 8×8 or 16×16 pattern will be replicated over the page. An object starting at pixel 27, 19 with respect to the origin will start with the pattern pixel 11 and 13 (27mod16 and 19mod16).

The variable data Glossmark™ differential gloss image is now generated by defining an area on the desired resultant page and filling it with the background Glossmark™ "color". Again, the start point of the pattern is defined by the origin of the page and thus no pattern shifting can occur. Next, the Glossmark™ variable image data is written into that rectangle by simply writing an alphanumeric string into this area using the foreground Glossmark™ "color". Since the foreground and background "colors" have identical color values—when averaged over a halftone cell—the entire area will look uniform to the human eye if observed straight-on. If the area is viewed at an angle (when printed at the correct resolution) the Glossmark™ variable data would appear as a differential gloss image in the hardcopy. It should be noted that we use a font to describe the foreground, but that any shape can be used as a font. Common types are Wingdings and Logo Fonts, but arbitrary shapes can be created and stored as fonts. Also, the method can be easily used with graphic objects that are defined by an area with the appropriate color. Whenever the word "font" is used throughout this specification, we intend it to include arbitrary shapes defined as Postscript™ fonts as well as single color graphic objects.

In detail, the above sample is created following the steps:

1) Set the color space to be "Pattern" (PostScript® operator "setcolorspace");

2) Select the background color to the Glossmark™ background color (PostScript® operator "setcolor") e.g.: to the first pattern 800A in FIG. 8;
3) Use the PostScript® "rectfill" operator to create and fill the rectangle (or any other shape) with the current color (pattern);
4) Position to a spot within the rectangle (PostScript® operator "moveto");
5) Select a font and make it the current font (PostScript® operators "findfont", "scalefont", "setfont");
6) Select the other of the two patterns for this color (PostScript® operator "setcolor") e.g. the second pattern 800B in FIG. 8;
7) Show the text using the current color (pattern) using the PostScript® operator "show".

Certain applications such as VIPP® (Variable Data Intelligence Postscript Printware) software module Postscript® preprocessor used for variable data already support the use of PostScript® pattern color spaces and VIPP® has been used to demonstrate this approach. For other applications, which do not support patterns, we can have the PostScript® interpreter overload interpretation of the standard color spaces of PostScript® (e.g. DeviceCMYK, DeviceRGB, Separations, etc.) so that the implementation of the PostScript® "setcolor" checks to see if the color is one which should be mapped into one of our selected patterns. For example, we may have the color with RGB values 0.995, 0.995, 0.995 (a very light gray) replaced within the interpreter by one of our pattern colors. This of course prevents the normal use of this RGB color for graphical and textual operations (it would still be available for images). As we have two patterns for each color we would also need to have another RGB color (for example with values 0.990, 0.995, 0.995) replaced by the other pattern. This operator overload technique is a common function call in PostScript®. It will be evident to those skilled in the art, that the above description while coached in the terminology of Postscript, reveals technique applicable to any one of many other PDL (Page Description Language) software packages and environments.

The above method is an efficient and expedient way to create Variable Data Glossmark™ hardcopy. The method is further exemplary in that it is compatible with currently existing workflows and hardware. This method is also exemplary in that the methodology does not put an additional burden on the DFE, thus allowing full speed operation of the machine or print system. However, as will be appreciated by those skilled in the art, attention must be applied in the alignment of the Variable Data object data with respect to the pattern structure. (Note that alignment as discussed here refers to the transition areas between the two different screens that should be aligned with the cell boundaries—the pattern alignment of the foreground and background is automatically achieved as described above) Thus in at least one embodiment, it may be desirable to use a bitmapped font that is downloaded to the DFE so as to avoid image artifacts. In this way, the string positions are more easily aligned with the cell pattern boundaries. This approach limits some of the fine detail structures (serifs) in fonts that may be attained. However, these fine structures are not typically visually perceived in Glossmark™ differential gloss image hardcopy anyway, due to the limitations of the human visual system.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for variable data differential gloss image control comprising:
   selecting a single color;
   selecting a first halftone having a first anisotropic structure orientation;
   creating a first color definition comprised of the single color and the first halftone;
   selecting a second halftone having a second anisotropic structure orientation different from that of the first halftone;
   creating a second color definition comprised of the single color and the second halftone;
   applying the first color definition to at least some portion of an image of interest; and
   applying the second color definition to the remaining portion of the image of interest to produce a variable data differential gloss image.

2. The method of claim 1 wherein the first anisotropic structure orientation and the second anisotropic structure orientation are 90 degrees apart.

3. The method of claim 2 wherein the first anisotropic structure has a horizontal orientation and the second anisotropic structure has vertical orientation.

4. The method of claim 3 wherein the first and second halftones are line type halftones.

5. The method of claim 3 wherein the first and second halftones are dot type halftones.

6. The method of claim 2 wherein the first anisotropic structure has a 45 degree orientation to the right and the second anisotropic structure has a 45 degree orientation to the left.

7. The method of claim 1 wherein the first anisotropic structure orientation and the second anisotropic structure orientation are less than 90 degrees apart.

8. The method of claim 1 wherein the variable data differential gloss image indicates addressee information.

9. The method of claim 8 wherein the variable data differential gloss image indicates an addressee name.

10. The method of claim 8 wherein the variable data differential gloss image indicates an addressee title.

11. The method of claim 8 wherein the variable data differential gloss image indicates addressee status.

12. The method of claim 1 wherein the variable data differential gloss image indicates time information.

13. The method of claim 1 wherein the variable data differential gloss image indicates date information.

14. The method of claim 1 wherein the variable data differential gloss image indicates identification information.

15. The method of claim 14 wherein the variable data differential gloss image indicates serial number information.

16. The method of claim 1 wherein the variable data differential gloss image indicates monetary value information.

17. The method of claim 1 wherein the variable data differential gloss image indicates job processing information.

18. The method of claim 1 wherein the variable data differential gloss image indicates a bar-code.

19. The method of claim 1 wherein the variable data differential gloss image indicates a logo.

20. A method for variable data differential gloss image control comprising:

segmenting an image of interest into a main area and a segment area;

selecting a single color;

selecting a first halftone having a first anisotropic structure orientation;

creating a first color definition comprised of the single color and the first halftone;

selecting a second halftone having a second anisotropic structure orientation different from that of the first halftone;

creating a second color definition comprised of the single color and the second halftone;

applying the first color definition to at least some portion of the segment area; and applying the second color definition to the remaining portion of the segment area to produce a variable data differential gloss image.

21. The method of claim 20 wherein the third halftone is a stochastic type.

22. The method of claim 20 wherein the third halftone is a cluster dot type.

23. The method of claim 20 wherein the variable data differential gloss image indicates addressee information.

24. The method of claim 23 wherein the variable data differential gloss image indicates an addressee name.

25. The method of claim 20 wherein the first anisotropic structure orientation and the second anisotropic structure orientation are 90 degrees apart.

26. The method of claim 20 wherein the first anisotropic structure orientation and the second anisotropic structure orientation are less than 90 degrees apart.

27. The method of claim 20 wherein the third halftone has an anisotropic structure orientation different from both the first halftone and the second halftone.

28. The method of claim 25 wherein the first anisotropic structure has a 45 degree orientation to the right and the second anisotropic structure has a 45 degree orientation to the left.

29. The method of claim 20 wherein the variable data differential gloss image indicates time information.

30. The method of claim 20 wherein the variable data differential gloss image indicates date information.

31. The method of claim 20 wherein the variable data differential gloss image indicates identification information.

32. The method of claim 20 wherein the variable data differential gloss image indicates serial number information.

33. The method of claim 20 wherein the variable data differential gloss image indicates monetary value information.

34. The method of claim 20 wherein the variable data differential gloss image indicates job processing information.

35. The method of claim 20 wherein the variable data differential gloss image indicates a bar-code.

36. The method of claim 20 wherein the variable data differential gloss image indicates a logo.

37. A method for variable data differential gloss image control comprising:

segmenting an image of interest into a main area and a segment area for variable data;

selecting a single color;

selecting a first halftone having a first anisotropic structure orientation;

creating a background color definition comprised of the single color and the first halftone;

selecting a second halftone having a second anisotropic structure orientation different from that of the first halftone;

creating a foreground color definition comprised of the single color and the second halftone;

applying the background color definition to fill the segment area; and writing an alphanumeric string into the segment area with the foreground color definition to produce a variable data differential gloss image.

38. A method for variable data differential gloss image control comprising:

segmenting an image of interest into a main area and a pre-selected area for variable data;

selecting a first single color described by an anisotropic pattern structure;

rendering said pre-selected area in said first single color;

selecting a second single color, differing from said first single color only in described anisotropic pattern structure;

selecting a font, outline or shape; and rendering said font, outline, or shape with said second single color in said pre-selected area to produce a variable data differential gloss image.

* * * * *